(12) United States Patent  
Jacob et al.

(10) Patent No.: US 9,516,068 B2  
(45) Date of Patent: *Dec. 6, 2016

(54) SEAMLESS HOST MIGRATION BASED ON NAT TYPE

(71) Applicant: SONY INTERACTIVE ENTERTAINMENT AMERICA LLC, San Mateo, CA (US)

(72) Inventors: Mark Lester Jacob, San Diego, CA (US); Ronald Joseph Roy, San Diego, CA (US); Adam Pierce Harris, San Diego, CA (US)

(73) Assignee: SONY INTERACTIVE ENTERTAINMENT AMERICA LLC, San Mateo, CA (US)

( * ) Notice: Subject to any disclaimer, the term of this patent is extended or adjusted under 35 U.S.C. 154(b) by 90 days.

This patent is subject to a terminal disclaimer.

(21) Appl. No.: 13/941,436

(22) Filed: Jul. 12, 2013

(65) Prior Publication Data

US 2013/0304931 A1 Nov. 14, 2013

Related U.S. Application Data

(63) Continuation of application No. 12/235,438, filed on Sep. 22, 2008, now Pat. No. 8,560,707, which is a (Continued)

(51) Int. Cl.
*G06F 15/16* (2006.01)
*H04L 29/06* (2006.01)
(Continued)

(52) U.S. Cl.
CPC ..... *H04L 65/1066* (2013.01); *H04L 29/12528* (2013.01); *H04L 61/2575* (2013.01);
(Continued)

(58) Field of Classification Search
CPC ............ H04L 65/1083; H04L 61/2575; H04L 67/1034; H04L 67/104; H04L 67/1051; H04L 67/1057; H04L 67/1093; H04L 69/40; H04L 63/029
See application file for complete search history.

(56) References Cited

U.S. PATENT DOCUMENTS 5,630,757 A 5/1997 Gagin et al.
5,634,129 A 5/1997 Dickinson
(Continued)

FOREIGN PATENT DOCUMENTS

CN 104069637 A 10/2014
EP 1125617 E 8/2001
(Continued)

OTHER PUBLICATIONS

U.S. Appl. No. 13/918,809 Office Action mailed Jun. 10, 2014.
(Continued)

*Primary Examiner* — Ario Etienne
*Assistant Examiner* — Blake Rubin
(74) *Attorney, Agent, or Firm* — Polsinelli LLP

(57) ABSTRACT

Systems and methods of the present invention for maintaining network data distribution are provided. Network data may be distributed in such as manner as to allow a network session to weather interrupted communications between host and clients without significant loss of data. Embodiments of the present invention provide for one or more clients to serve as backup host(s) for the network session, such determinations including the use of NAT profile information. When the other clients transmit data to the host, they may also transmit the data to one or more backup hosts if there are any indications of interrupted communication.

16 Claims, 5 Drawing Sheets

Related U.S. Application Data continuation-in-part of application No. 12/049,954, filed on Mar. 17, 2008, now Pat. No. 8,131,802.

(60) Provisional application No. 60/997,918, filed on Oct. 5, 2007.

(51) Int. Cl.
  *H04L 29/12* (2006.01)
  *H04L 29/08* (2006.01)
  *H04L 29/14* (2006.01)

(52) U.S. Cl.
  CPC .......... *H04L 67/101* (2013.01); *H04L 67/104* (2013.01); *H04L 67/1034* (2013.01); *H04L 67/1051* (2013.01); *H04L 67/1093* (2013.01); *H04L 67/34* (2013.01); *H04L 69/24* (2013.01); *H04L 69/40* (2013.01); *H04L 63/029* (2013.01)

(56) References Cited

U.S. PATENT DOCUMENTS

| | | |
|---|---|---|
| 5,682,139 A | 10/1997 | Pradeep |
| 5,704,032 A | 12/1997 | Badovinatz et al. |
| 5,823,879 A | 10/1998 | Goldberg |
| 5,826,085 A | 10/1998 | Bennett |
| 5,838,909 A | 11/1998 | Roy et al. |
| 5,841,980 A | 11/1998 | Waters et al. |
| 5,893,106 A | 4/1999 | Brobst et al. |
| 5,941,947 A | 8/1999 | Brown |
| 5,956,485 A | 9/1999 | Perlman |
| 5,984,787 A | 11/1999 | Redpath |
| 5,987,376 A | 11/1999 | Olson et al. |
| 6,041,312 A | 3/2000 | Bickerton et al. |
| 6,050,898 A | 4/2000 | Vange |
| 6,098,091 A | 8/2000 | Kisor |
| 6,106,569 A | 8/2000 | Bohrer |
| 6,108,569 A | 8/2000 | Shen |
| 6,142,472 A | 11/2000 | Kliebisch |
| 6,151,632 A * | 11/2000 | Chaddha ........... H04L 29/06027 375/240.01 |
| 6,152,824 A | 11/2000 | Rothschild et al. |
| 6,154,782 A | 11/2000 | Kawaguchi et al. |
| 6,203,433 B1 | 3/2001 | Kume |
| 6,219,045 B1 | 4/2001 | Leahy et al. |
| 6,247,017 B1 | 6/2001 | Martin |
| 6,311,209 B1 | 10/2001 | Olson et al. |
| 6,345,297 B1 | 2/2002 | Grimm |
| 6,352,479 B1 | 3/2002 | Sparks |
| 6,363,416 B1 | 3/2002 | Naeimi |
| 6,470,022 B1 | 10/2002 | Rochberger |
| 6,487,583 B1 | 11/2002 | Harvey |
| 6,487,678 B1 | 11/2002 | Briskey et al. |
| 6,519,629 B2 | 2/2003 | Harvey |
| 6,530,840 B1 | 3/2003 | Cuomo |
| 6,539,494 B1 * | 3/2003 | Abramson ........... G06F 11/203 714/4.3 |
| 6,549,946 B1 | 4/2003 | Fisher |
| 6,560,636 B2 | 5/2003 | Cohen et al. |
| 6,561,811 B2 | 5/2003 | Rapoza et al. |
| 6,577,628 B1 | 6/2003 | Hejza |
| 6,587,874 B1 | 7/2003 | Golla |
| 6,607,444 B2 | 8/2003 | Takahashi et al. |
| 6,631,412 B1 | 10/2003 | Glasser et al. |
| 6,654,831 B1 * | 11/2003 | Otterness et al. .............. 710/74 |
| 6,676,521 B1 | 1/2004 | La Mura et al. |
| 6,704,885 B1 * | 3/2004 | Salas-Meza ........ G06F 11/1461 707/999.202 |
| 6,748,420 B1 | 6/2004 | Quatrano et al. |
| 6,761,636 B2 | 7/2004 | Chung et al. |
| 6,763,371 B1 | 7/2004 | Jandel |
| 6,769,990 B2 | 8/2004 | Cohen |
| 6,799,255 B1 | 9/2004 | Blumenau |
| 6,844,893 B1 | 1/2005 | Miller et al. |
| 6,931,446 B1 | 8/2005 | Cox et al. |
| 7,003,550 B1 | 2/2006 | Cleasby et al. |
| 7,016,942 B1 * | 3/2006 | Odom ........................... 709/212 |
| 7,018,295 B2 | 3/2006 | Sakaguchi et al. |
| 7,025,675 B2 | 4/2006 | Fogel |
| 7,035,919 B1 | 4/2006 | Lee et al. |
| 7,056,217 B1 | 6/2006 | Pelkey et al. |
| 7,089,301 B1 | 8/2006 | Labio et al. |
| 7,107,312 B2 | 9/2006 | Hackbarth et al. |
| 7,165,107 B2 | 1/2007 | Pouyoul et al. |
| 7,177,950 B2 | 2/2007 | Narayan et al. |
| 7,188,145 B2 | 3/2007 | Lowery et al. |
| 7,203,755 B2 | 4/2007 | Zhu et al. |
| 7,290,264 B1 | 10/2007 | Powers et al. |
| 7,454,458 B2 | 11/2008 | Islam et al. |
| 7,523,163 B2 | 4/2009 | Zhu et al. |
| 7,539,216 B2 | 5/2009 | Johns et al. |
| 7,587,465 B1 | 9/2009 | Muchow |
| 7,613,800 B2 | 11/2009 | Dhupelia |
| 7,640,298 B2 | 12/2009 | Berg |
| 7,680,908 B2 | 3/2010 | Gates, III et al. |
| 7,711,847 B2 | 5/2010 | Dhupelia |
| 7,720,908 B1 | 5/2010 | Newson et al. |
| 7,730,206 B2 | 6/2010 | Newson et al. |
| 7,792,902 B2 | 9/2010 | Chatani |
| 7,822,809 B2 | 10/2010 | Dhupelia |
| 7,831,666 B2 | 11/2010 | Chatani et al. |
| 7,877,509 B2 | 1/2011 | Dhupelia |
| 7,908,393 B2 | 3/2011 | Marr et al. |
| 7,930,345 B2 | 4/2011 | Dhupelia |
| 7,962,549 B2 | 6/2011 | Dhupelia |
| 8,051,180 B2 | 11/2011 | Mazzaferri et al. |
| 8,131,802 B2 | 3/2012 | Jacob |
| 8,335,813 B2 | 12/2012 | Sun et al. |
| 8,402,124 B1 | 3/2013 | Barillaud et al. |
| 8,554,842 B2 | 10/2013 | Maehiro |
| 8,560,707 B2 | 10/2013 | Jacob |
| 8,719,375 B2 | 5/2014 | Hildreth et al. |
| 8,725,874 B2 | 5/2014 | Keohane et al. |
| 8,856,233 B2 * | 10/2014 | Lacapra et al. ................ 709/204 |
| 8,972,548 B2 | 3/2015 | Jacob |
| 9,032,248 B1 * | 5/2015 | Petty ................... G06F 11/2038 714/11 |
| 9,369,540 B2 | 6/2016 | Lowery et al. |
| 2001/0009868 A1 | 7/2001 | Sakaguchi et al. |
| 2001/0024974 A1 | 9/2001 | Cohen |
| 2001/0037466 A1 | 11/2001 | Fukutake et al. |
| 2001/0044339 A1 | 11/2001 | Cordero et al. |
| 2002/0023117 A1 | 2/2002 | Bernardin et al. |
| 2002/0035604 A1 | 3/2002 | Cohen et al. |
| 2002/0042830 A1 | 4/2002 | Bose et al. |
| 2002/0049086 A1 | 4/2002 | Otsu |
| 2002/0062348 A1 | 5/2002 | Maehiro |
| 2002/0075844 A1 | 6/2002 | Hagen |
| 2002/0082077 A1 | 6/2002 | Johnson |
| 2002/0107934 A1 | 8/2002 | Lowery et al. |
| 2002/0107935 A1 | 8/2002 | Lowery et al. |
| 2002/0115488 A1 | 8/2002 | Berry |
| 2002/0133707 A1 | 9/2002 | Newcombe |
| 2002/0156917 A1 | 10/2002 | Nye |
| 2002/0169889 A1 | 11/2002 | Yang et al. |
| 2002/0184070 A1 | 12/2002 | Chen et al. |
| 2003/0018717 A1 | 1/2003 | Ruths et al. |
| 2003/0018719 A1 | 1/2003 | Ruths |
| 2003/0073494 A1 | 4/2003 | Kalpakian et al. |
| 2003/0126245 A1 | 7/2003 | Feltin et al. |
| 2003/0167343 A1 | 9/2003 | Furuno |
| 2003/0190960 A1 | 10/2003 | Jokipii |
| 2003/0204566 A1 | 10/2003 | Dhupelia |
| 2003/0204593 A1 | 10/2003 | Brown et al. |
| 2003/0217135 A1 | 11/2003 | Chatani |
| 2003/0217158 A1 | 11/2003 | van Datta |
| 2004/0001476 A1 | 1/2004 | Islam et al. |
| 2004/0024879 A1 | 2/2004 | Dingman |
| 2004/0030787 A1 | 2/2004 | Jandel |
| 2004/0031052 A1 | 2/2004 | Wannamaker et al. |
| 2004/0053690 A1 | 3/2004 | Fogel |
| 2004/0059711 A1 | 3/2004 | Jandel |
| 2004/0117443 A1 | 6/2004 | Barsness |

(56) References Cited

U.S. PATENT DOCUMENTS

| | | |
|---|---|---|
| 2004/0139228 A1 | 7/2004 | Takeda |
| 2005/0038836 A1* | 2/2005 | Wang .................... G06F 3/0601 |
| 2005/0068894 A1* | 3/2005 | Yu et al. ........................ 370/235 |
| 2005/0105526 A1 | 5/2005 | Stiemerling |
| 2005/0144521 A1* | 6/2005 | Werner ............................ 714/20 |
| 2005/0245317 A1* | 11/2005 | Arthur et al. .................... 463/42 |
| 2005/0251577 A1 | 11/2005 | Guo |
| 2005/0259637 A1 | 11/2005 | Chu |
| 2005/0262411 A1 | 11/2005 | Vertes |
| 2006/0015560 A1* | 1/2006 | MacAuley .............. A63F 13/12 709/206 |
| 2006/0047836 A1* | 3/2006 | Rao et al. ...................... 709/229 |
| 2011/0375526 | 3/2006 | Chatani |
| 2006/0075127 A1 | 4/2006 | Juncker |
| 2006/0085792 A1* | 4/2006 | Traut .................. G06F 11/1438 718/100 |
| 2006/0100020 A1 | 5/2006 | Kasai |
| 2006/0164974 A1* | 7/2006 | Ramalho et al. ............. 370/219 |
| 2006/0168107 A1 | 7/2006 | Balan et al. |
| 2006/0190540 A1 | 8/2006 | Chatani |
| 2006/0200551 A1 | 9/2006 | Bali et al. |
| 2006/0218274 A1 | 9/2006 | Labio et al. |
| 2006/0218275 A1 | 9/2006 | Labio et al. |
| 2006/0247011 A1 | 11/2006 | Gagner |
| 2006/0248144 A1 | 11/2006 | Zhu et al. |
| 2006/0253595 A1 | 11/2006 | van Datta |
| 2006/0288103 A1 | 12/2006 | Gobara |
| 2007/0058792 A1 | 3/2007 | Chaudhari |
| 2007/0061460 A1 | 3/2007 | Khan |
| 2007/0076729 A1 | 4/2007 | Takeda |
| 2007/0094325 A1 | 4/2007 | Ih et al. |
| 2007/0165629 A1 | 7/2007 | Chaturvedi |
| 2007/0174399 A1 | 7/2007 | Ogle et al. |
| 2007/0191109 A1 | 8/2007 | Crowder |
| 2007/0208748 A1 | 9/2007 | Li |
| 2007/0217436 A1 | 9/2007 | Markley |
| 2007/0233865 A1* | 10/2007 | Garbow .............. G06F 11/0796 709/226 |
| 2007/0288598 A1* | 12/2007 | Edeker .............. H04L 29/12066 709/217 |
| 2007/0291706 A1* | 12/2007 | Miller et al. ................... 370/338 |
| 2008/0049755 A1 | 2/2008 | Gannon et al. |
| 2008/0189365 A1 | 8/2008 | Narayanaswami et al. |
| 2008/0243953 A1* | 10/2008 | Wu et al. ....................... 707/204 |
| 2008/0280686 A1 | 11/2008 | Dhupelia et al. |
| 2008/0291839 A1 | 11/2008 | Hooper et al. |
| 2009/0006545 A1 | 1/2009 | Dhupelia |
| 2009/0006604 A1 | 1/2009 | Dhupelia |
| 2009/0077245 A1 | 3/2009 | Smelyansky |
| 2009/0089363 A1 | 4/2009 | Keohane et al. |
| 2009/0094370 A1 | 4/2009 | Jacob |
| 2009/0113060 A1 | 4/2009 | Jacob |
| 2009/0138610 A1 | 5/2009 | Gobara |
| 2009/0157882 A1 | 6/2009 | Kashyap |
| 2009/0240821 A1 | 9/2009 | Juncker |
| 2009/0287828 A1 | 11/2009 | Wei et al. |
| 2010/0153496 A1 | 6/2010 | Heinla |
| 2010/0279767 A1 | 11/2010 | Dhupelia |
| 2010/0285872 A1 | 11/2010 | Dhupelia |
| 2010/0287239 A1 | 11/2010 | Chatani |
| 2012/0166651 A1 | 6/2012 | Jacob |
| 2014/0256449 A1 | 9/2014 | Chatani et al. |
| 2015/0180958 A1 | 6/2015 | Jacob |

FOREIGN PATENT DOCUMENTS

| | | |
|---|---|---|
| EP | 1499987 | 1/2005 |
| EP | 2360874 | 8/2011 |
| EP | 2360875 | 8/2011 |
| GB | 2325543 A | 11/1998 |
| IN | 269863 | 12/2015 |
| JP | 05-022346 | 1/1993 |
| JP | 63-32725 | 9/1998 |
| JP | 11-234326 | 8/1999 |
| JP | 2000-124939 | 4/2000 |
| JP | 2000-157724 | 6/2000 |
| JP | 2001-187273 | 7/2001 |
| JP | 2001-314657 | 11/2001 |
| JP | 2002-011251 | 1/2002 |
| JP | 2003-099337 | 4/2003 |
| TW | 201347493 | 11/2013 |
| TW | I491229 | 7/2015 |
| WO | WO 00/05854 | 2/2000 |
| WO | WO 00/10099 | 2/2000 |
| WO | WO 00/68864 | 11/2000 |
| WO | WO 01/63423 | 8/2001 |
| WO | WO 01/82678 | 11/2001 |
| WO | WO 02/35769 | 5/2002 |
| WO | WO 03/091894 | 11/2003 |
| WO | WO 03/100643 | 12/2003 |
| WO | WO 2004/063843 | 7/2004 |
| WO | WO 2005/088466 | 9/2005 |
| WO | WO 2006/023508 | 3/2006 |
| WO | WO 2009/045475 | 4/2009 |

OTHER PUBLICATIONS

U.S. Appl. No. 13/412,361 Office Action mailed Jun. 17, 2014.
U.S. Appl. No. 13/918,809 Office Action mailed Apr. 29, 2015.
Taiwan Application No. 097138349, Office Action dated Mar. 26, 2014.
European Application No. 03724201.3, Office Action mailed Dec. 13, 2013.
Chinese Application No. 20088011547.1, Decision of Rejection dated Jul. 5, 2013.
"Brief for Appellee," in re Masayuki Chatani et al., U.S. Court of Appeals for the Federal Circuit (2007-1150) (May 21, 2007).
"Brief of Appellants," in re Masayuki Chatani et al., U.S. Court of Appeals for the Federal Circui (2007-1150) (Mar. 23, 2007).
"In Re Masayuki Chatani and Glen Van Datta," United States Court of Appeals for the Federal Circuit, 2007-1150 (U.S. Appl. No. 11/211,128), Nov. 19, 2007.
"Petition for Panel Rehearing," In Re Masayuki Chatani and Glen Van Datta, Appeal From the United States Patent and Trademark Office, Boar of Patent Appeals and Interferences, In the United States Court of Appeals for the Federal Circuit, 2007-1150 (U.S. Appl. No. 10/211,128), Jan. 3, 2008.
"Reply Brief of Appellants," in re Masayuki Chatani et al., U.S. Court of Appeals for the Federal Circuit (2007-1150) (Jun. 4, 2007).
"Technical Issues of establishing any-to-any 2-way real-time communications over the internet," Apr. 24, 2005, URL http://web.archive.org/web/20050424081036/.
Aronson, Jesse. "Using Groupings for Networked Gaming," Gamasutra.com, Jun. 21, 2000.
Audet, F. Nat Behavioral Requirements for Unicast UDP, BEHAVE Internet-Draft, Jul. 15, 2005.
Boulic, Ronan etl al. "Integration of Motion Control Techniques for Virtual Human and Avatar Real-Time Animation," Swiss Fedl Inst. of Tech., Lausanne, Switzerland, Sep. 1997.
Chiueh, Tzi-cker, "Distributed Systems Support for Networked Games," Computer Science Department, State University of New York at Stony Brook, Stony Brook, NY, May 1997.
Cisco Systems Inc., "Network Flow Management: Resource Reservation for Multimedia Flows," Mar. 19, 1999.
Diot et al., "A Distributed Architecture for Multiplayer Interactive Applications on the Internet", Aug. 1999, Network, IEEE, vol. 13, Issue 4, Jul.-Aug. 1999, pp. 6-15.
ECC Report 50. "Technical Issues of Establishing Any-to-Any-2-Way Real-Time Communications over the Internet." Electronic Communications Committee (ECC). Gothenburg, Jul. 2004.
Festa and Borland, "Netscape alumni to launch P2P company", Aug. 2, 2001, (avaiable at http://news.cnet.com/news/0/1005-202-6766377.html).
Hagsand O: Interactive Multiuser Ves in the DIVE System: IEEE Multimedia, IEEE Service Center, New York, NY, US vol. 3, No. 1, Mar. 21, 1996, pp. 30-39, XP000582951 ISSN: 1070-986X.
Hanada, S. "The Design of Network Game and DirectPlay," Inside Windows, Softbank K.K., vol. 4, pp. 42-57, Apr. 1, 1998.

(56) References Cited

OTHER PUBLICATIONS

Rosenberg, J. Interactive Connectivity Establishment (ICE): A Methodology for Network Address Translator (NAT) Traversal for Multimedia Session Establishment Protocols, Mmusic Internet-Draft, Jul. 19, 2004.
Rosenberg, J. Interactive Connectivity Establishment (ICE): A Methodology for Network Address Translator (NAT) Traversal for Offer/Answer Protocols, Mmusic Internet-Draft, Jul. 17, 2005.
Rosenberg, J. Interactive Connectivity Establishment (ICE): A Methodology for Network Address Translator (NAT) Traversal for Multimedia Session Establishment Protocols, Mmusic Internet-Draft, Oct. 25, 2004.
Rosenberg, J. Interactive Connectivity Establishment (ICE): a Methodology for Network Address Translator (NAT) Traversal for Off/Answer Protocols, Mmusic Internet-Draft, Jan. 16, 2007.
Rosenberg, J. "Simple Traversal of UDP Through Network Address Translators (NAT)," BEHAVE Internet—Draft, Jul. 17, 2005.
Rosenberg, J. Stun—Simple Traversal of User Datagram Protocols (UDP) Throught Network Address Translators (NATs), Network Working Group, Mar. 2003.
Rosenberg, J. Traversal using Relay NAT (TURN), MIDCOM Internet—Draft, Oct. 20, 2003.
Takeda, Y. Symmetric NAT Traversal Using STUN, Internet Engineering Task Force, Jun. 2003.
EP 03 721 1413, European Search Report dated Jun. 30, 2005.
PCT/US03/08682 International Search Report mailed Oct. 14, 2003.
Chinese Application No. 03801033, Office Action mailed Jun. 9, 2006.
Chinese Application No. 03801033, Office Action mailed Jul. 5, 2011.
Chinese Application No. 03801033, Office Action mailed Sep. 25, 2009.
European Application No. 03724201.3, Office Action mailed Jul. 3, 2012.
PCT/US03/12668 International Search Report mailed Jul. 17, 2003.
Chinese Application No. 200810168739.8, Decision of Rejection dated Dec. 11, 2012.
Chinese Application No. 200810168739.8, Office Action dated May 11, 2012.
Chinese Application No. 200810168739.8, Office Action dated May 19, 2011.
Chinese Application No. 20088011547.1, Office Action dated Oct. 12, 2012.
Chinese Application No. 20088011547.1, Office Action dated Mar. 7, 2012.
Chinese Application No. 20088011547.1, Office Action dated Aug. 10, 2012.
EP 08014892.7 Office Action mailed Jul. 20, 2011.
EP 08835745.4 Extended European Search Report dated Jul. 22, 2011.
EP 11004182.9 Extended European Search Report dated Jul. 14, 2011.
EP 11004181.1 Extended European Search Report dated Jul. 22, 2011.
PCT/US08/11415 Search Report and Written Opinion mailed Dec. 5, 2008.
U.S. Appl. No. 10/211,128 Final Office Action mailed Feb. 2, 2004.
U.S. Appl. No. 10/211,128 Office Action mailed Nov. 10, 2003.
U.S. Appl. No. 11/375,526 Office Action mailed Apr. 8, 2008.
U.S. Appl. No. 11/375,526 Final Office Action mailed Jul. 3, 2007.
U.S. Appl. No. 11/375,526 Final Office Action mailed Mar. 2, 2007.
U.S. Appl. No. 11/375,526 Office Action mailed Oct. 24, 2006.
U.S. Appl. No. 11/403,623 Office Action mailed Jun. 25, 2009.
U.S. Appl. No. 11/403,623 Office Action mailed Apr. 9, 2008.
U.S. Appl. No. 11/403,623 Final Office Action mailed Jul. 3, 2007.
U.S. Appl. No. 11/403,623 Final Office Action mailed Mar. 5, 2007.
U.S. Appl. No. 11/403,623 Office Action mailed Oct. 24, 2006.
U.S. Appl. No. 12/840,977 Office Action mailed Jul. 30, 2013.
U.S. Appl. No. 12/840,977 Final Office Action mailed Jun. 18, 2012.
U.S. Appl. No. 12/840,977 Final Office Action mailed Oct. 19, 2011.
U.S. Appl. No. 12/840,977 Office Action mailed May 16, 2011.
U.S. Appl. No. 12/840,977 Final Office Action mailed Dec. 3, 2010.
U.S. Appl. No. 10/359,359 Final Office Action mailed Nov. 27, 2009.
U.S. Appl. No. 10/359,359 Office Action mailed Mar. 31, 2009.
U.S. Appl. No. 10/359,359 Office Action mailed Aug. 27, 2007.
U.S. Appl. No. 10/359,359 Final Office Action mailed Feb. 9, 2007.
U.S. Appl. No. 10/359,359 Office Action mailed Aug. 8, 2006.
U.S. Appl. No. 12/839,306 Office Action mailed Nov. 12, 2010.
U.S. Appl. No. 12/839,311 Office Action mailed Nov. 12, 2010.
U.S. Appl. No. 12/218,581 Office Action mailed Sep. 2, 2010.
U.S. Appl. No. 12/218,581 Office Action mailed Feb. 1, 2010.
U.S. Appl. No. 12/218,581 Office Action mailed Oct. 2, 2009.
U.S. Appl. No. 12/218,591 Office Action mailed Feb. 25, 2009.
U.S. Appl. No. 12/049,954 Final Office Action mailed Dec. 14, 2010.
U.S. Appl. No. 12/049,954 Office Action mailed Jun. 24, 2010.
U.S. Appl. No. 12/235,438 Final Office Action mailed Jan. 4, 2012.
U.S. Appl. No. 12/235,438 Office Action mailed Aug. 8, 2011.
U.S. Appl. No. 12/235,438 Final Office Action mailed Aug. 31, 2010.
U.S. Appl. No. 12/235,438 Office Action mailed Apr. 15, 2010.
U.S. Appl. No. 13/412,361 Final Office Action mailed Nov. 28, 2012.
U.S. Appl. No. 13/412,361 Office Action mailed Jul. 30, 2012.
U.S. Appl. No. 13/918,809 Final Office Action mailed Nov. 18, 2015.
U.S. Appl. No. 14/283,959 Office Action mailed Feb. 4, 2016.
U.S. Appl. No. 14/283,959, filed May 21, 2014, Masayuki Chatani, Managing Participants in an Online Session.
U.S. Appl. No. 14/283,959 Final Office Action mailed Jul. 19, 2016.
U.S. Appl. No. 14/637,182 Office Action mailed Sep. 9, 2016.
Chinese Application No. 201410266012.9, Office Action mailed Jul. 27, 2016.

* cited by examiner

SEAMLESS HOST MIGRATION BASED ON NAT TYPE

CROSS-REFERENCE TO RELATED APPLICATIONS

The present application is a continuation and claims the priority benefit of U.S. patent application Ser. No. 12/235,438 filed Sep. 22, 2008, which is a continuation-in-part and claims the priority benefit of U.S. patent application Ser. No. 12/049,954 filed Mar. 17, 2008, now U.S. Pat. No. 8,131,802, which claims priority benefit of U.S. provisional application No. 60/997,918 filed Oct. 5, 2007, the disclosures of which are incorporated herein by reference.

The present application is related to the following commonly owned patent applications: U.S. patent application Ser. No. 10/211,128 filed Jul. 31, 2002; U.S. patent application Ser. No. 10/359,359 filed Feb. 4, 2003; and U.S. patent application Ser. No. 12/235,409 filed Sep. 22, 2008. The present application is also related to U.S. patent application Ser. No. 11/243,853 filed Oct. 4, 2005. The disclosure of each of the aforementioned applications is incorporated herein by reference.

BACKGROUND OF THE INVENTION

1. Field of the Invention

The present invention relates generally to networks. More specifically, the present invention relates to data distribution in networks and the use of Network Address Translation (NAT).

2. Description of the Related Art

A network may include a group of computing devices connected together by a communications system. A computer in the network may communicate, exchange data, and share resources with the other computers in the network. Examples of networks include a personal area network (PAN), local area network (LAN), and wide area network (WAN).

Various network configurations are known in the art. The traditional client-server network illustrated in FIG. 1A includes a host 110 connected to clients 120A-D. The host 110 establishes the network session 130, controls which and how many clients may join the network session 130 and how the clients 120A-D interact with each other once they have joined network session 130. Because the host 110 generally has large amounts of bandwidth and processing power, the host 110 is may be capable of managing and distributing data to and from all the clients 120A-D in the network session 130. In such a configuration, data from a particular client (e.g., client 120D) may be distributed to other clients (e.g., clients 120A-C) through the host 110. For example, client 120D may transmit data to the host 110. When another client, such as client 120A, requests that data, the host 110 transmits that data to client 120A.

By virtue of being connected to the host, a client may request only the data that the client needs (via the host) so that the client does not have to manage otherwise unneeded data. Such an arrangement may be common amongst clients that do not have the ability to effectively manage all the data exchanged within a network session. These clients may require a host to manage and distribute the data.

A disadvantage of having the host manage and distribute data in a network session is that data can be lost when there are connectivity issues affecting communications between the host and any one of the session clients. In such an instance, the data from a particular client cannot be transmitted to the host. That data would also be unavailable to the other clients in the network. For example, client 120D may suddenly become disconnected from the host 110. Information that client 120D would have sent to the host 110 never reaches the host 110 and, as a consequence, the information cannot be transmitted to the rest of the network (i.e., clients 120A-C). The missing information may cause a disruption to the network session 130, possibly affecting the operations of the other clients. This may be especially true in the context of interactive network game play.

A further problem may arise with respect to network address translation (NAT) when trying to establish communication amongst clients through peer-to-peer communication (P2P). P2P communication generally refers to direct communication between client devices connected to a network. Examples of P2P applications include, but are not limited to, voice over Internet protocol (VoIP), bit torrent transmission, video transmission, file sharing, data sharing, and other types of direct data transfer between clients that does not exceed the bandwidth capabilities of an individual client.

Utilizing the NAT protocol, multiple nodes or computing devices may share a single Internet or local network Internet Protocol (IP) address. In one example, a local area network may use a public, global address for external network traffic and a (or set of) private IP address(es) for internal network traffic. Most clients in a network are connected to a central server, which is situated behind a NAT firewall (hereinafter referred to as a NAT). Four types of NAT are generally known in the art: full cone, restricted cone, port restricted, and symmetric.

A full cone NAT takes all requests from the same internal IP address and port and maps them to the same external IP address and port. Any external host can send a packet to the internal host by sending a packet to the mapped external address. In a restricted cone NAT, all requests from the same internal IP address and port are likewise mapped to the same external IP address and port. Unlike a full cone NAT, however, an external host (with IP address X) can send a packet to the internal host only if the internal host had previously sent a packet to IP address X.

A port restricted NAT is like a restricted cone NAT but the restriction includes port numbers. Specifically, an external host can send a packet with source IP address X and source port P to the internal host only if the internal host had previously sent a packet from IP address X and port P. In the final example—a symmetric NAT—all requests from the same internal IP address and port, to a specific destination IP address and port, are mapped to the same external IP address and port. If the same host sends a packet with the same source address and port, but to a different destination, a different mapping is used. Furthermore, only the external host that receives a packet can send a user data protocol (UDP) packet back to the internal host.

There is, therefore, a need in the art for improved systems and methods for network data distribution that addresses problems related to network session connectivity and maintaining an uninterrupted exchange of data in the session. In this context, it is desirable for a host in a P2P network to have a favorable NAT profile in order to create an optimal P2P network. There is, therefore, a further need in the art for determining a host with a favorable NAT profile amongst several clients connected to a central server.

SUMMARY OF THE PRESENTLY CLAIMED INVENTION

Systems and methods of the present invention provide for maintaining network data distribution that would allow a network session to weather interrupted communication between a host and clients without any loss of data. Host functions migrate to a client seamlessly and without significant loss of data. Embodiments of the present invention provide for one or more clients to serve as a backup host for the network session. When the other clients transmit data to the host, they may also transmit the data to one or more backup hosts. For example, a client that sends data to the host may not receive acknowledgement of the data within a certain period of time. That client may re-transmit the data to the host, as well as transmit the data to the backup host. Determining a backup host may be based on (NAT) profile information shared between the host and clients upon establishment of the connections between the host and the plurality of clients Various embodiments of the present invention include methods for network data distribution. Such methods include connecting a host to clients, determining whether a client is capable of serving as a backup host, and if so, transmitting to that client certain information that would allow the client serve as the backup host. This determination may utilize NAT profile information. Serving as the backup hosts includes receiving information from other clients when those other clients cannot communicate with the host. In some embodiments of the present invention, the method further provides for indicating that communications between a host and a client are interrupted and for terminating the connection between the host and the particular client.

Various embodiments of the present invention include systems for network data distribution. Such systems may include a host, a first client capable of serving as a backup host, and a second client capable of transmitting data to the first client when communications between the host and the second client is interrupted. In some embodiments of the present invention, the second client may also serve as a backup host. Some embodiments of the present invention may include a plurality of clients, each configured to serve as backup hosts. NAT profile information may be utilized in determinations as to backup host viability.

A host system for use in network distribution systems may also be provided by embodiments of the present invention. Such host systems may include an acknowledgement module to acknowledge client communications upon receipt, a negotiation module to negotiate whether a particular client is capable of serving as a backup host, and a backup application module to deliver to the client an application providing host information. Some embodiments of the present invention further include a host information database and a timer. NAT profile information may be collected, analyzed, and utilized in determining backup host viability.

Some embodiments of the present invention include computer storage media and instructions for network data distribution. Such instructions may provide for connecting a host to clients, negotiating with a client capable of serving as a backup host through the use of NAT profile information, and transmitting host information to the client so that it may begin serving as a backup host.

DETAILED DESCRIPTION

The present invention includes systems and methods for network data distribution. Embodiments of the present invention may allow host migration to occur seamlessly. A network session may continue without significant loss of data in the event of interrupted communication between a host and a client. A host of a network session may be connected to a number of clients. One (or more) of these clients may be capable of serving as a backup host. Backup viability is negotiated with a client and host information is transmitted to the client, which may then act as a backup host. The backup host may then connect to and receive data from the other clients in the network session. Thereafter, if communication between the host and a particular client is interrupted, that particular client may transmit its data to the backup host allowing the network session to continue without any loss of data.

The elements identified throughout are exemplary and may include various alternatives, equivalents, or derivations thereof. Various combinations of hardware, software, and computer-executable instructions may be utilized. Program modules and engines may include routines, programs, objects, components, and data structures that effectuate the performance of particular tasks when executed by a processor, which may be general purpose or application specific. Computer-executable instructions and associated data structures stored in a computer-readable medium represent examples of programming means for executing the steps of the methods and/or implementing particular system configurations disclosed herein.

Figure 1A:
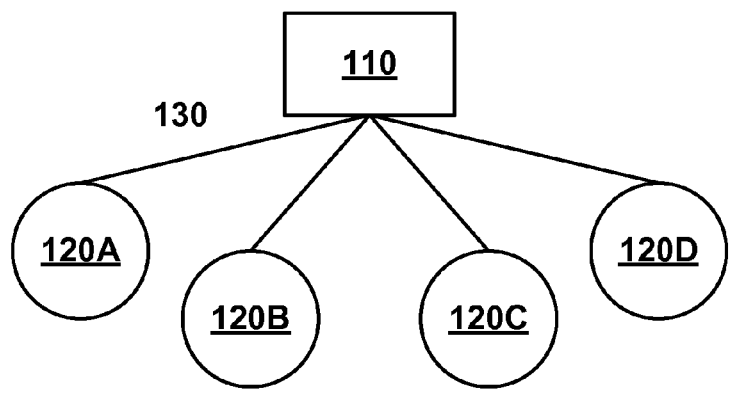
FIG. 1A illustrates a client-server network configuration as it is known in the art.

In the client-server network configuration illustrated in FIG. 1A and as discussed in detail above, each client does not have to process all the data in a network session. Instead, each client receives and processes only the data that is necessary for the client to participate in the network session. Some clients are not capable of managing all the data efficiently due to, for example, lack of bandwidth or lack of processing power. Some clients, however, do have the ability to manage all the data in a network session. These particular clients may act as backup hosts, storing some or all of the data from the network session.

Figure 1B:
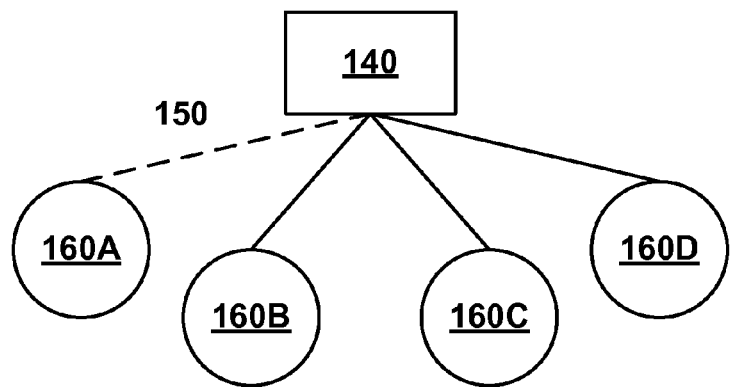
FIG. 1B illustrates an exemplary system for network data distribution with one backup host.

In contrast to the system configuration of FIG. 1A, FIG. 1B illustrates an exemplary system for network data distribution with one backup host, client 160A. A backup host may be any client capable of performing some or all of the functions of a host of a network session. When the host 140 of the network session 150 cannot or does not perform, some or all of the hosting responsibilities may migrate to a backup host. To qualify as a backup host requires the candidate host (client) to exhibit backup viability. Exhibiting backup viability may involve meeting one or more requirements concerning, for example, bandwidth, processing power, memory, hardware or software configurations, or quality of service. A client's backup viability may be determined through negotiation with the host.

After completing negotiations concerning and confirming backup viability, host information may be transmitted between host 140 and client 160A through network session 150. The host information may include the network name, the internet protocol (IP) addresses of the clients in the network, firewall information, and information concerning specific responsibilities should client 160A need to takeover certain host responsibilities. Using the host information, client 160A may be able to act as a backup host in the event that one or more connections between the host 140 and the other clients 160B-D become interrupted. For example, if client 160B becomes disconnected from host 140, client 160B may transfer data to client 160A as will be illustrated in the context of FIG. 3A and FIG. 3B. By migrating host responsibilities from host 140 to client 160A, information from client 160B is not completely lost to the network session 150.

Figure 1C:
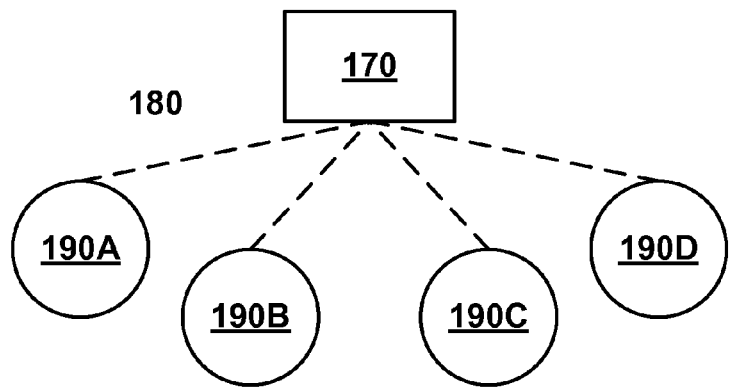
FIG. 1C illustrates an exemplary system for network data distribution with several backup hosts.

In some embodiments, more than one client may be capable of serving as backup hosts. FIG. 1C illustrates an exemplary system for network data distribution with several backup hosts-clients 190A-D. Each client in the network session 180 of FIG. 1C may be responsible for particular backup host responsibilities should original host 170 become unavailable. For example, client 190A may be responsible for scorekeeping while client 190B may be responsible for state changes in the game environment. Client 190C may be responsible for admissions criteria (e.g., who may participate in the game) whereas client 190D may be responsible for chat functionality. Alternatively, client 190A may be responsible for all of the aforementioned tasks and clients 190B-D take over those tasks should client 190A subsequently fail.

Figure 1D:
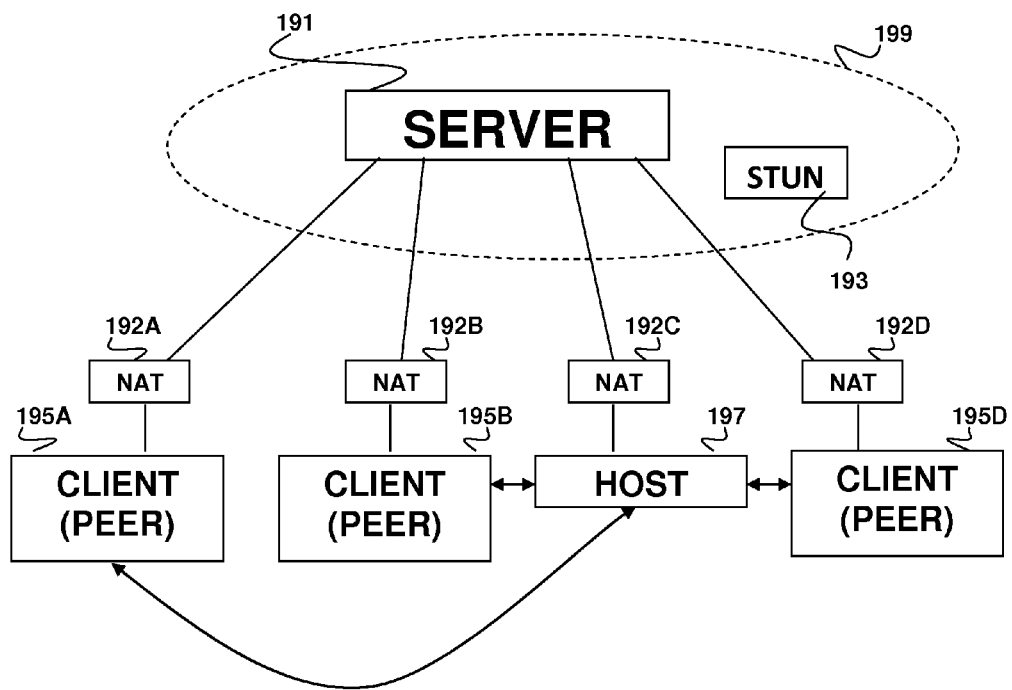
FIG. 1D illustrates an exemplary system for network data distribution utilizing a NAT.

FIG. 1D illustrates an exemplary system for network data distribution utilizing a NAT. Client devices 195A, 195B, 197, and 195D on the network are initially connected to server 191 in an external network 199. Server 191 may monitor data for game play between clients 195A, 195B, 197, and 195D connected to the external network 199.

Clients 195A, 195B, 197, and 195D may be situated behind corresponding network address translators (NAT) 192A, 192B, 192C, and 192D. Each NAT may be configured according to an Internet standard that enables a local area network (LAN) to use one set of private IP addresses for internal traffic and a second set of global IP addresses for external traffic. Most NATs perform dynamic translation on IP addresses such that external networks have no way of reaching the internal network prior to the internal network initiating communication. Because clients 195A, 195B, 197, and 195D establish server-client relationships, however, communication between the server 191 and clients 195A, 195B, 197, and 195D is not limited by the NATs 192A, 192B, 192C, and 192D.

In establishing a P2P network in which clients can communicate directly with each other, one client may be established as a host 197 by which other peers 195 (clients connected to the P2P network who are not the host) may establish direct connections with each other. Peers 195 may be connected in a configuration known as a fully connected grid (FCG). Such a configuration may prevent any one peer from being a bottle neck. Host 197 may be determined based on the NAT profile of each client. The NATs 192A, 192B, 192C, and 192D may be of one of four different NAT configurations referenced above (Full Cone, Restricted Cone NAT, Port Restricted Cone, and Symmetric).

Traversal of full cone, restricted cone and port restricted cone NATs is generally more complicated than traversing symmetric NATs. NAT traversal may be implemented if a client is behind a symmetric NAT as is described in U.S. patent application Ser. No. 11/243,853, the disclosure of which has been previously incorporated. In particular, the client may perform a port prediction involving construction of a list of predicted transport addresses on the NAT behind which the client is situated. The client may then send an INVITE message containing the list of predicted transport addresses from the first node to a second client. The client behind the symmetric NAT may then perform a connectivity check with the second node using the predicted transport addresses. Connectivity checks may be performed by sending Simple Traversal of UDP through NAT (STUN) requests to each predicted transport address in parallel. When the client behind the symmetric NAT receives the requests, the client sends a STUN response to the second client. If the second client receives the STUN response, it can then begin to send information to that address.

There may be NAT types other than the four described above. In some cases it may be possible to traverse NATs using standard techniques. In other instances, NAT behavior may be so unpredictable or unstable that communication with a client behind such a NAT is unreliable. Because the duty of the host 107 is to communicate information between other peers 195A, 195B, and 195D, it is important that the host 197 be behind a NAT of a type that does not interfere with its ability to communicate. In those instances where the peers 195A, 195B, 195D and the host 197 are in a fully connected grid (FCG), it may be particularly desirable to use a host behind a NAT that does not interfere with its ability to communicate. This allows for providing the highest level of service to the greatest number of peers.

By selecting a host 197 with the most favorable NAT profile, more reliable P2P communication may be obtained. Once the host 197 has been established, peers 195 can communicate with each other by initially transmitting information to the host 197, which then relays that information to the respective recipient peer 195. Clients may also transmit information directly after using host 197 to establish a direct communication path.

In certain embodiments, clients 195A, 195B, 195D, and 197 may obtain NAT profile information through a STUN server 193 that is associated with the external network 199. STUN server 193 utilizes a lightweight protocol that allows an IP enabled client to discover the presence and types of NAT behind which the client is situated. STUN server 193 works with most NAT types and does not depend on any special behavior of the NAT. STUN server 193, in one respect, acts like a mirror held up to a client 195A so that the client 195A can see how its local transport address gets mapped to a public transport address. The client 195A can also determine the type of the NAT 192A behind which the client 195A is situated through communication with the STUN server 193.

Each client 195A, 195B, 197, 195D may use a STUN server 193 to obtain NAT profile information, which it may then relay to the central server 191 in order for the central server 191 to determine which client would make the most favorable host 197. Likewise, a client 195A, 195B, 197, 195D may use a STUN server 193 to obtain NAT profile information that may then be relayed to all other clients 195 attempting to communicate through the P2P network in order for the clients 195A, 195B, 197, 195D to best determine the host 197.

Each client connected to the server 191 may collect its own NAT profile information for use within the P2P network. This profile information may include information regarding the NAT type behind which the client is situated, information regarding whether the NAT supports universal plug and play (UPnP), information regarding whether the NAT exhibits port preservation, and information regarding whether the NAT supports port predictability.

Port preservation, as used in the context of the present applications, means that once an internal IP address is mapped to a particular external port that it will be consistently mapped to that particular port. Similarly, port predictability means that it is possible to predict the external port to which an internal IP address will be mapped even if it is not always the same port. For example, the external port number may be consistently incremented with each attempted mapping of the internal IP address.

The NAT profile information for each client may be used to create a priority list amongst all the clients connected to the server in order to best select the host for P2P communication. If there is a tie in priority between potential hosts, ordinal numbers may be assigned to determine which potential host is selected as the actual host. In some embodiments, such ordinal numbers may be assigned by a server in the order in which the clients connected to the server. Alternatively, a distributed arbitration algorithm may be used to select a host from amongst two or more equally suitable potential hosts. If the initial host decides to leave the P2P network or is somehow disconnected from the network, this information may be used to select the next host for the P2P network in order to seamlessly maintain network connectivity.

Once profile information has been collected by a given client, the NAT profile for that client is shared with other clients that are connected to the server. Distribution may occur through peer-to-peer distribution or from the client to the server to the remaining clients. A server may distribute profile information through a dedicated network connection. Once all NAT profiles have been submitted by the clients, a determination is made as to whether a particular client should be a host, peer, or if they fail to meet the requirements for network interaction as a whole. This determination may be made based on the profile information obtained for each client described above.

For example, by assigning a priority based on a number of factors, a host can be selected from amongst the available clients based on the client having the most favorable profile. The rest of the clients may be assigned as peers or may fail to be recognized as a peer or host based on their profile information. For example, a client behind a non-traversable NAT may not meet the requirements necessary to connect to the network as a peer or host.

An exemplary prioritization scheme may break clients down into five separate distinctions: Active, Likely, Unknown, In Progress, and Inactive. An active tag indicates that a client is a very good candidate for host. A likely tag indicates that a client is a good candidate for host but priority is still given to a client with an active tag. An unknown tag indicates that the network is unable to decide whether that particular client is a good candidate for host. An in progress tag indicates that the network is still deciding whether the client is a good candidate for host. Lastly, an inactive tag indicates that a client is unable to assume the duties of a host.

Priority tags may be based on four exemplary criteria: NAT type, universal plug and play (UPnP) capability, port preservation, and port predictability. Several other factors may also be used in determining priority. These factors may fall under a client's quality of service profile and may include QoS information including but not limited to ping time, bandwidth behavior, geography, latency, and IP provider.

Figure 2:
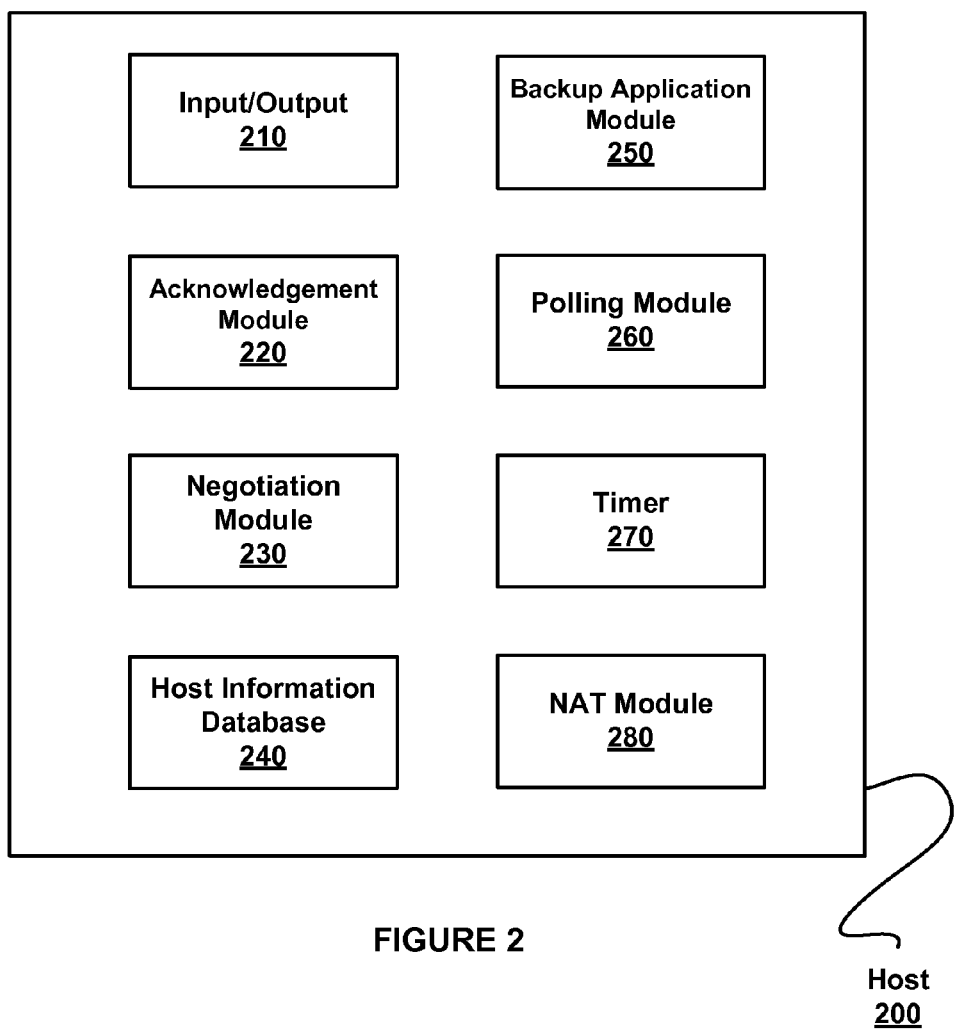
FIG. 2 illustrates an exemplary configuration for a computing device offering seamless host migration in a network data distribution system.

FIG. 2 illustrates an exemplary configuration 200 for a computing device offering seamless host migration in a network data distribution system. The host 200, which may act as a central communications hub in a network, may be a computing device such as a server. A computing device typically reserved for client operations may also exhibit some or all of the configurations of host 200 due to the fact that a client may, at some point, become a backup host. Host 200 may include a network interface 210, acknowledgement module 220, negotiation module 230, host information database 240, backup application module 250, polling module 260, timer 270, and NAT module 280.

A module (or application), as referenced in the present invention, is a collection of routines that perform various system-level functions. A module may be dynamically loaded and unloaded (e.g., executed) by hardware (such as processing devices) and device drivers as required. The modular software components described herein may also be incorporated as part of a larger software platform or integrated as part of an application specific component.

Network interface 210 may be any of a variety of hardware and/or software components configured to allow for communication between the host and other computing devices in the network. Network interface 210 may include components for communicating over wired, wireless, and/or Internet-based communications networks.

Acknowledgement module 220 allows for verification that information transmitted by a client was received by the host 200. When host 200 receives information from a client through network interface 210, acknowledgement module 220 may transmit an acknowledgement of receipt (ACK) to the client sending the information. For example, if a client sends information concerning a change in game state data to host 200, acknowledgement module 220 may transmit an ACK reply to the transmitting client indicating that information was received. The ACK reply sent by acknowledgement module 220 may further include an indication of what information was received and how much of that information was received and/or if any of that information was corrupted or otherwise incomplete.

Non-receipt of an ACK with respect to a particular data transmission by the transmitting client may indicate that the data transmission was never received by the host 200. Non-receipt of the data transmission (or a portion thereof) by the host 200 may indicate a problem with the connection between the host 200 and the client that sent the data transmission or the host 200 in and of itself. If a particular number of data transmissions fail to receive an ACK reply from the host 200, the transmitting client may invoke a migration operation whereby some or all of the host functionalities are migrated to a backup host.

Negotiation module 230 negotiates the backup viability of a client based on a variety of parameters. For example, a viable backup host/client candidate may be required to have a certain amount of available bandwidth. The bandwidth of the client may need to be sufficient to allow the client to manage all the data in the network session. Backup viability may require that the client conform to various quality of service standards as they relate to, for example, ping rate, packet loss, available memory, processor speed, and the like.

Negotiation module 230 may further determine whether the client candidate is capable of connecting to each of the other clients in the network. A viable backup host may need to be able to connect to and receive information from each of the other clients in the network. The parameters for backup viability may be determined by the type of network session. For example, a particular gaming network session may require a certain amount of bandwidth and processor speed for backup viability due to the number of state changes that may occur in the game environment. Less complex transactions, such as simple file transfers, may require less bandwidth and/or processing power.

Negotiation module 230 may be configured to negotiate backup viability with multiple clients thereby resulting in a series of backup hosts. Alternatively, the negotiation module 230 may be configured to allocate backup responsibilities for particular tasks amongst a group of clients. By providing for a series of backup hosts, hosting duties may migrate seamlessly from a host to a first backup host to a second backup host and so on as network or host/client conditions warrant. An order of backup host responsibilities and/or the particular responsibilities may be assigned based on the order in which the clients connected to the host. Alternatively, order and/or responsibilities may be based on other factors such as bandwidth or quality of service.

Host information database 240 may store information concerning the host, the clients, or the network session. The information stored in host information database 240 may allow for a computing device to perform certain hosting duties, such as connecting to the other clients in the network session. Such host information may include the network name, the Internet protocol (IP) addresses of the clients in the network, and firewall information. Host information database 240 may be updated when events such as a client disconnecting from the network or a new client joining the network occur. The IP addresses of the new clients would, for example, need to be added to the host information database 240.

Operating in conjunction with host information database 240, backup application module 250 generates an application that may be downloaded, installed, and executed on the client. This application provides a client with certain operational functionality that may be required of the client in order for it to serve as a backup host in addition to satisfying underlying viability requirements. The application may configure the client for connecting to and for exchanging data with other clients in the network session.

Optional polling module 260 may be configured to poll all the clients in a network session. Polling module 260 may be used to poll clients for connectivity. Polling for connectivity may include sending small packets of data to each client in the network session, receiving replies/acknowledgments from clients that have received the data packets, and determining which clients have problems communicating with the host 200.

Polling module 260 may automatically poll clients at periodic intervals. Polling module 260 may also be configured to poll clients when certain events occur, such as a new client joining the network session or an indication of interrupted communication (e.g., a client does not acknowledge data sent by host 200). The polling operation of polling module 260 may be akin to a periodic heartbeat like that described in U.S. patent publication number 2003-0204566 for a "Multi-User Application Program Interface," the disclosure of which has previously been incorporated by reference.

Host 200 may also include a timer 270. Timer 270 may be configured to measure how much time has elapsed after an event. Host 200 may use timer 270 to determine the time between a data transmission like that generated by polling module 260 and acknowledgement of that data transmission. Such information may be used to determine whether to terminate a connection to a particular client. If host 200 receives no acknowledgment or no poll response from a particular client for a period of time, as measured by timer 270, host 200 may terminate the connection with that client.

The application generated by the backup application module 250 may further include certain functionality similar to that of polling module 260 and timer 270. Unlike the host 200 that may be seeking to determine whether to eject a particular client from the network session, this 'heartbeat' functionality may be used by a client designated as a backup host to determine when the host 200 is no longer capable or has continuously failed to fulfill certain host duties. The inability or failure of a host 200 to fulfill certain duties may be indicated by a continued lack of receipt of an ACK or heartbeat as may be generated by acknowledgment module 220.

The host 200 may also include a NAT module 280. Execution of the NAT module 280 may allow for the collection, sharing and receipt of NAT profile information. Execution of the NAT module 280 may similarly allow for a determination as to a most viable host in a network utilizing NAT profile information. NAT profile information may be stored in memory, a dedicated database, or other database such as host information database 240.

Host 200 (and any number of clients) may reside behind a network address translator, which translates an internal IP address to a public IP address for a particular computing device. The public IP address is that address seen by other computing devices in a network. In some embodiments, host 200 or other computing device may incorporate the network address translator. In some networks, however, a NAT may not be used at all. NAT profile information may include information about the type of NAT (if any) in use, the ability of the NAT to engage in universal plug and play (UPnP), the NAT's ability to maintain port preservation, and the NAT's port predictability.

In some instances, host 200 (or other computing devices in the network) may apply a supplemental arbitration filter based on additional information such as quality of service information, to arbitrate a determination of the host device from among two or more equally likely candidate devices. Quality of service information may include factors such as the client's ping time, bandwidth behavior, geography, latency, IP provider, and so forth. Such additional information may also be stored in the memory or databases (dedicated or otherwise).

Figure 3A:
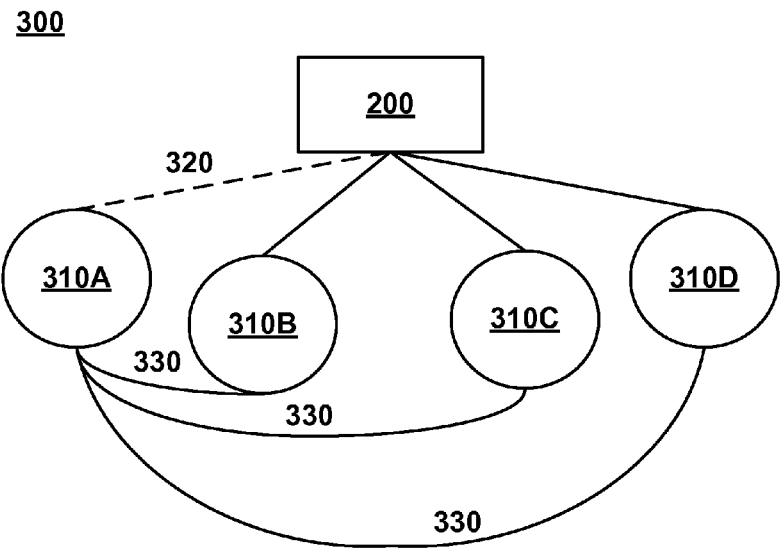
FIG. 3A illustrates an implementation of an exemplary system for network data distribution, which may include a network address translator.

FIG. 3A illustrates an implementation of an exemplary system 300 for network data distribution, which may include a network address translator (not shown). Host 200 is connected to a plurality of clients 310A-D. Client 310A has successfully negotiated backup viability with host 200 and received host information through connection 320. Using the host information, client 310A connects to the other clients in the network, namely, clients 310B-D. Connections 330 allow for clients 310B-D to communicate directly (i.e., not through host 200) with client 310A. Clients 310B-D may use the connections 330 to exchange data with client 310A if each respective client has difficulty transmitting that data to the host 200. Clients 310B-D may also transmit data to client 310A automatically, irrespective of any difficulties with data transmissions to the host 200.

Figure 3B:
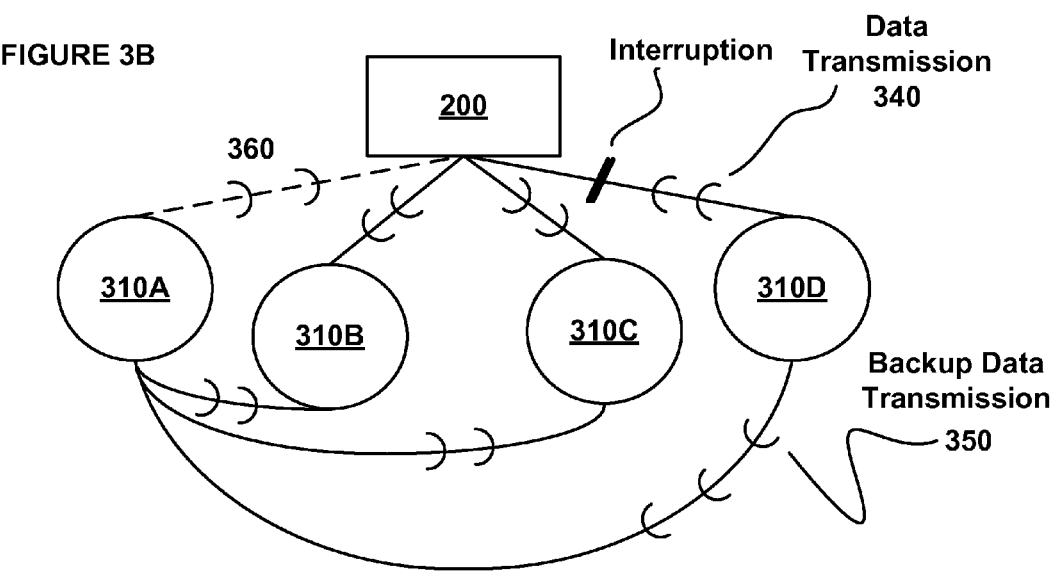
FIG. 3B illustrates an alternate implementation of an exemplary system for network data distribution, which may include a network address translator.

FIG. 3B illustrates an alternate implementation of an exemplary system for network data distribution, which may include a network address translator (not shown). In particular, FIG. 3B illustrates an exemplary system for network data distribution where communications between a host 200 and a client 310D are interrupted. Specifically, the illustrated data transmission 340 between host 200 and client 310D is shown as being unsuccessful. While client 310D is attempting to send data transmission 340 to the host 200, a faulty connection prevents the transmission from ever being received by the host 200.

Because client 310A is a backup host for the network session, client 310D can send the same data intended for the host 200 in a backup data transmission 350 directly to client 310A (i.e., not through host 200). Client 310A may then send that data in a data transmission 360 to the host 200. Client 310A, in this particular embodiment, acts as a proxy between client 310D and host 200 due to the faulty connection separating client 310D and host 200. Host 200 may then distribute the data from client 310D to clients 310B and 310C albeit received via client 310A. Alternatively, client 310A may send the data to clients 310B or 310C if, for example, host 200 was unable to maintain host duties versus the connection between client 310D and host 200 simply being defective.

Because communications between the host 200 and client 310D has been disrupted, client 310D may need to obtain session data through client 310A. Client 310A may act as an intermediary for both the receipt and transmission of data with respect to host 200 and client 310D in addition to making requests for data on the behalf of either computing device.

Figure 4:
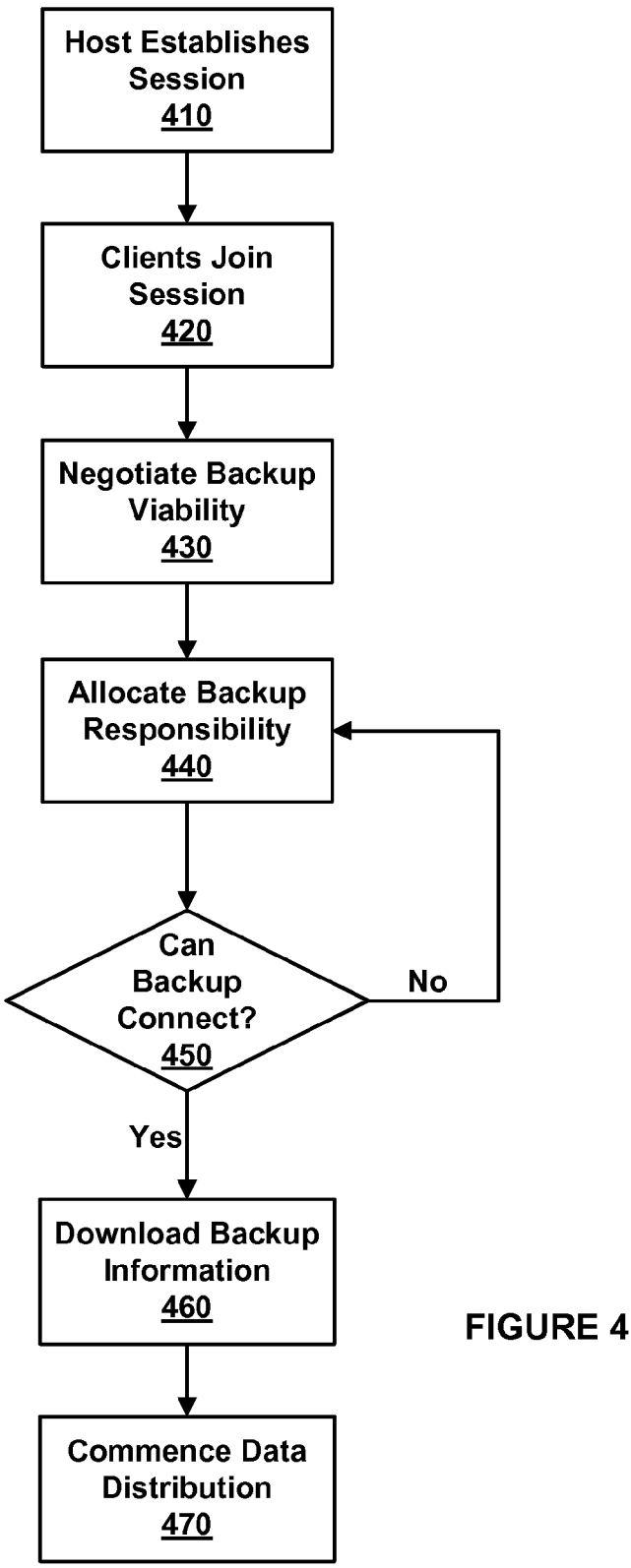
FIG. 4 depicts an exemplary method for network data distribution, which may include the use of NAT profile information.

FIG. 4 is a flowchart depicting an exemplary method 400 for network data distribution, which may include the use of NAT profile information. The steps identified in FIG. 4 (and the order thereof) are exemplary and may include various alternatives, equivalents, or derivations thereof including but not limited to the order of execution of the same. The steps of the process of FIG. 4 (and its various alternatives) may be embodied in hardware or software including a machine-readable or computer-readable storage medium (e.g., optical disc, memory card, or hard drive) including instructions executable by a processor.

In step 410, a host (e.g., host 200) establishes a network session. The host may set certain parameters for who may join the network session, as well as various aspects of how the network session will proceed. A host may establish a private network session that only certain clients or invited clients may join. Alternatively, the host may establish a network session that is open to the public and any client may join.

In step 420, multiple clients join the network session by connecting to the host. If the host has set certain parameters concerning who may join the network session, the clients may need to satisfy those parameters before being allowed to connect the host or to participate in the network session.

In step 430, backup viability is negotiated via the negotiation module 220 of FIG. 2. One or more clients may be viable backup hosts with the capacity and resources to serve as a backup hosts. Backup viability may be negotiated as soon as a client joins the network session. Various aspects of backup viability, including bandwidth and quality of service, may be evaluated to determine whether a particular client is capable of serving as a backup host. NAT profile information may likewise be considered. Depending on the requirements of negotiation module 220, there may be one, more than one, or no viable backup hosts among the clients in the network session. Backup responsibilities may also be distributed.

In step 440, backup responsibility is allocated. Where there are multiple clients that are viable backup hosts, backup responsibility may need to be allocated among those clients with respect to order and/or particular responsibilities. Clients in the network session may transmit their data to the first viable backup host as may have been identified by the host or the first deemed backup through a broadcast or other communication as exemplified in U.S. patent publication number 2003-0217135, the disclosure of which has previously been incorporated by reference. For example, a network computer participating in an online session may periodically broadcast an update message notifying other network computers of its presence in the online session. If not the update message is received from a particular network computer within a predetermined amount of time, then it is deemed that the network computer has exited the online session. If the first viable backup host is or becomes incapable of serving as a backup host, the other clients may transmit their data to the second viable backup host to join the network session. The need to communicate with a secondary backup host may be indicated utilizing means as disclosed herein and/or the aforementioned U.S. patent publication number 2003-0217135.

In step 450, it is determined whether a particular client can connect to each of the other clients in the network session. A backup host needs to be able to connect to each and every other client in the session. If a first client cannot connect to a second client, that first client cannot serve as a backup host for the network session. For example, the first client may have firewall issues that would prevent the first client from making certain types of connections. If a potential backup host cannot connect to another client for any reason, the method may return to step 440 and re-allocate backup responsibility.

Once it has been determined that a client is a viable backup host and can connect to all of the other clients in the network session, the method proceeds to step 460. In step 460, backup information is downloaded to a viable backup host. By providing the backup information to a backup host, the host can drop out of the network, and the backup host is capable of providing any information required by the other clients in the network session. Backup information may be provided as a part of the download and installation of an application facilitating seamless host transitions as discussed in the context of backup application module 250 of FIG. 2.

In step 470, network data distribution may commence. As illustrated in FIG. 3A, the data transmissions may occur between a host and a client. As FIG. 3B further illustrates, data transmission may also occur between two clients, from a client with host connectivity issues to a client capable of acting as a backup host. Further, that backup host may forward that data on to the host or directly to the other clients upon request. Through whatever connection(s) the data must be relayed, the data is provided to those computing devices that require that data.

While the present invention has been described with reference to exemplary embodiments, it will be understood by those skilled in the art that various changes may be made and equivalents may be substituted for elements thereof without departing from the true spirit and scope of the present invention. In addition, modifications may be made without departing from the essential teachings of the present invention. Various alternative systems may be utilized to implement the various methodologies described herein and various methods may be used to achieve certain results from the aforementioned systems.

What is claimed is:

1. A method for maintaining network data distribution, the method comprising:
    establishing a network session by connecting a host to each of a plurality of clients over a network;
    negotiating backup viability of a first client from among the plurality of clients, wherein negotiating backup viability includes:
        identifying a level of bandwidth necessary to manage all data exchanged between all of the clients in the network session,
        receiving data identifying a level of bandwidth available to the first client,
        confirming that the level of bandwidth available to the first client is at least equal to the level of bandwidth necessary to manage all data exchanged between all of the clients in the network session, and
        receiving data confirming that the first client is capable of establishing a connection with all other clients among the plurality of clients;
    receiving host information by the first client from the host after the negotiation confirms that the first client exhibits backup viability, wherein based on at least the host information the first client establishes a connection as a backup host with a second client from among the plurality of clients,
    polling the plurality of clients to determine connectivity between the host and each of the client of hosts, wherein interrupted communications are indicated by result of the polling, and
    receiving data at the first client from the second client of the plurality of clients when communication between the host and the second client is interrupted, wherein the interrupted communication is identified by a lack of acknowledgement from the host to the second client within an amount of time after the second client transmits data to the host.

2. The method of claim 1, further comprising sending an indication from the host to each of the plurality of clients concerning the interrupted communication.

3. The method of claim 1, further comprising terminating a connection between the host and the second client based on the interrupted communication.

4. The method of claim 1, wherein transmitting host information to the first client includes transmitting an application that, when executed by a processor of the first client, provides the host information.

5. The method of claim 1, further comprising:
    negotiating backup viability of a third client from the plurality of clients; and
    transmitting host information to the third client such that the third client connects to all other clients from the plurality of clients based on at least the host information, wherein the third client receives data from the second client when communication between the first client and the second client is interrupted.

6. The method of claim 5, wherein the second client further transmits the data to the first client before transmitting the data to the third client based on at least an order in which a connection was established with the host.

7. The method of claim 5, wherein the second client further transmits the data to the first client before transmitting the data to the third client based on at least the level of bandwidth of the first client and a level of bandwidth of the third client.

8. A system for maintaining network data distribution, the system comprising:
    a host that establishes a network session with a plurality of clients, wherein the host receives and acknowledges the receipt of data from each of the plurality of clients, polls the plurality of clients concerning connectivity and notifies each of the plurality of clients concerning an interrupted communication between the host and the second client;
    a first client that receives host information after backup viability of a first client from the plurality of clients has been determined based on a parameter of the first client, wherein the parameter includes a level of bandwidth, wherein determining backup viability includes identifying a level of bandwidth necessary to manage all data exchanged between all of the clients in the network session, receiving data identifying a level of bandwidth available to the first client, confirming that the level of bandwidth available to the first client is at least equal to the level of bandwidth necessary to manage all data exchanged between all of the clients in the network session, and receiving data confirming that the first client is capable of establishing a connection with all other clients among the plurality of clients, and wherein the first client connects as a back-up host to a second client from the plurality of clients based on at least the host information.

9. The system of claim 8, wherein the second client also notifies each of the plurality of clients concerning the interrupted communication between the host and the second client.

10. The system of claim 8, wherein the second client also terminates a connection between the host and the second client.

11. A computing device for maintaining data distribution in networks, the computing device comprising:
    an acknowledgement module stored in memory and executable by a processor to transmit a reply acknowledging data received from a first client from among a plurality of clients in a network session;
    a negotiation module stored in memory and executable by a processor to negotiate backup viability of a first client based on a parameter of the first client, wherein negotiating backup viability includes:
        identifying a level of bandwidth necessary to manage all data exchanged between all of the clients in the network session,
        receiving data identifying a level of bandwidth available to the first client,
        confirming that the level of bandwidth available to the first client is at least equal to the level of bandwidth necessary to manage all data exchanged between all of the clients in the network session, and
        receiving data confirming that the first client is capable of establishing a connection with all other clients among the plurality of clients;
    a backup application module stored in memory and executable to transmit an application providing host information to the first client after the negotiation confirms that the first client exhibits backup viability, such that the first client connects as a back-up host to a second client from the plurality of clients based on at least the host information, and
    a polling module stored in memory and executable to:

poll the plurality of clients to determine connectivity between the host and each of the plurality of clients, wherein an interrupted communication is indicated by results of the polling, and receive data at the first client from the second client of the plurality of clients when communication between the host and the second client is interrupted, wherein the interrupted communication is identified by a lack of acknowledgement from the host to the second client within an amount of time after the second client transmits data to the host.

12. The computing device of claim 11, further comprising a host information database that stores information concerning each client from among a plurality of clients.

13. The computing device of claim 12, wherein the host information database further stores updated information based on addition or removal of a client from among the plurality of clients.

14. The computing device of claim 11, further comprising a timer application executable to measure how much time has elapsed after an event.

15. A non-transitory computer-readable storage medium having embodied thereon a program, the program being executable by a processor to perform a method for group messaging, the method comprising:

establishing a network session by connecting a host to a plurality of clients, wherein data exchanged between the host and each of the plurality of clients is acknowledged upon receipt;

negotiating backup viability of a first client from the plurality of clients, wherein negotiating backup viability includes:

identifying a level of bandwidth necessary to manage all data exchanged between all of the clients in the network session, receiving data identifying a level of bandwidth available to the first client, confirming that the level of bandwidth available to the first client is at least equal to the level of bandwidth necessary to manage all data exchanged between all of the clients in the network session, and receiving data confirming that the first client is capable of establishing a connection with all other clients among the plurality of clients;

transmitting host information to the first client after the negotiation confirms that the first client exhibits backup viability, wherein the first client connects as a back-up host to a second client from the plurality of clients based on at least the host information and the first client receives data from the second client from the plurality of clients, polling the plurality of clients to determine connectivity between the host and each of the client of hosts, wherein interrupted communications are indicated by result of the polling, and receiving data at the first client from the second client of the plurality of clients when communication between the host and the second client is interrupted, wherein the interrupted communication is identified by a lack of acknowledgement from the host to the second client within an amount of time after the second client transmits data to the host.

16. The non-transitory computer-readable storage medium of claim 15, wherein the program further comprises executable instructions that, when executed by the processor, terminate a connection between the host and the second client.

* * * * *